United States Patent [19]
Banman et al.

[11] Patent Number: 5,557,751
[45] Date of Patent: Sep. 17, 1996

[54] METHOD AND APPARATUS FOR SERIAL DATA COMMUNICATIONS USING FIFO BUFFERS

[75] Inventors: David A. Banman, Los Altos; Robert A. Clark, San Jose, both of Calif.

[73] Assignee: Sun Microsystems, Inc., Mountain View, Calif.

[21] Appl. No.: 501,704

[22] Filed: Jul. 12, 1995

Related U.S. Application Data

[63] Continuation of Ser. No. 189,062, Jan. 27, 1994, abandoned.

[51] Int. Cl.⁶ ................................................ G06F 13/00
[52] U.S. Cl. .................... 395/250; 364/239.6; 364/939.7
[58] Field of Search ....................................... 395/250, 275, 395/500, 800, 775

[56] References Cited

U.S. PATENT DOCUMENTS

| | | | |
|---|---|---|---|
| 4,583,163 | 4/1986 | Kobayashi | 395/250 |
| 4,616,338 | 10/1986 | Helen | 395/425 |
| 5,179,661 | 1/1993 | Copeland | 364/DIG. 2 |
| 5,179,662 | 1/1993 | Corrigan | 395/250 |
| 5,182,543 | 1/1993 | Siegel et al. | 340/531 |
| 5,189,543 | 2/1993 | Lin | 359/142 |

FOREIGN PATENT DOCUMENTS

A-0359137 9/1989 European Pat. Off. ........ G06F 28/13

*Primary Examiner*—David Y. Eng
*Attorney, Agent, or Firm*—Blakely Sokoloff Taylor & Zafman

[57] ABSTRACT

An improved serial communications circuit, which includes support for Infra Red communications over a number of incompatible IR protocols is provided. To improve serial throughput, and reduce the overhead required of a Central Processing Unit, separate Transmit and Receive FIFO's are provided to buffer incoming and outgoing serial data. These FIFO's are controlled by a state machine which can adjust interrupt requests to the CPU based on the contents of the FIFO's and the time elapsed between interrupt service requests. In addition an improved multi-mode Infra Red modulation and demodulation system is provided which may support, alongside standard hard wired serial communications, wireless IR communications with personal information managers, laptop and palmtop computers, and other personal and professional electronic equipment which may employ an IR remote control.

11 Claims, 7 Drawing Sheets

METHOD AND APPARATUS FOR SERIAL DATA COMMUNICATIONS USING FIFO BUFFERS

This is a continuation of application Ser. No. 08/189,062, filed Jan. 27, 1994, now abandoned.

BACKGROUND OF THE INVENTION

1. Field of the Invention

This invention relates, in general, to the field of microprocessor serial communications and, more particularly, to an improved interface between an asynchronous serial port and an IEEE 1496 SBus, including support for infrared data transmission and reception.

2. Background

In the development of more powerful personal computers and workstations it has become increasingly important to be able to efficiently process information within a computer at the same time that data is being received into or transmitted out of the computer across a serial data line. When typical maximum serial transmission speeds encountered were relatively slow (i.e. 1200 baud), even moderately efficient central processing units (CPU's) were capable of processing incoming serial data without such tasks presenting significant overhead to the CPU. However, as typical serial transmission speeds have increased (i.e. 14.4k baud to 115k baud and higher), the processing of such incoming serial data has required the dedication of even greater system resources. In many systems it has reached a point where incoming information may be lost as the incoming serial data stream can not be processed quickly enough.

One solution to the above noted problem has been to incorporate control signals within the serial communications circuitry in order to allow the CPU to signal when it is capable of processing an incoming serial data stream, thereby turning on and off the actual reception of an incoming serial data stream. Unfortunately, such a technique is less than optimal since, by restricting the reception of data, effective throughput of the entire communications chain is reduced. In addition, even with such basic flow control, under certain timing considerations incoming information may still be lost as the CPU is unable to properly halt the flow of incoming data in a timely manner.

Another solution to the above noted problem has been the development of specialized serial communications circuits known as UART's (Universal Asynchronous Receiver Transmitter) which incorporate a small internal buffer for buffering, for example, 16 bytes of data. Unfortunately, this solution suffers from two additional deficiencies. First, since the internal buffer included in these buffered UART's is so small, it is still necessary to occasionally turn off the flow of data completely so as to avoid a data overrun. Second, since the buffering is done within the UART itself, control over the buffering process is removed from the system's CPU, thereby decreasing overall flexibility in the processing of incoming data.

In addition to the above noted limitations found in present serial communications circuits, another concern to the designers of modern serial communications systems is that while information is traditionally received into a computer system over a hard wired connection (such as a fiber optic or copper cable), the development of Personal Information Managers (PIM's) and other handheld or otherwise portable computers has also seen the development of wireless connections between terminals and computers. Unfortunately, no standard has yet emerged for wireless data transfer, so along with each PIM there has also developed a unique wireless, and often incompatible, infra-red data transmission and reception scheme. Two such systems currently in use is one developed by the Hewlett-Packard company for use on their 'palmtop' computer, the 95LX and 100LX, and one developed by the Sharp Corporation for use in their PIM and the Apple Newton. As noted, these systems are incompatible with each other and, in fact, although they are both based on IR transmission and reception technology, are also incompatible with the traditional IR remote controls often found in the home or office for the control of audio and video equipment.

Therefore, it has been determined that the need exists for an improved asynchronous serial control circuit which overcomes the limitations of the prior art through the improved handling of high speed serial i/o without increasing the processing overhead required by the main CPU, while in addition being able to handle serial communications from multiple, and incompatible, infra-red data transmission standards.

SUMMARY OF THE INVENTION

The improved asynchronous serial communications circuit of the invention provides an interface between multiple serial ports and the SBus as defined by IEEE Std 1496-1993. The circuit is optimized for high data transfer rates while maintaining a low interrupt level and low interrupt frequency.

The communications circuit incorporates large FIFO buffers, separate and apart from those incorporated within the actual communications UART's, to buffer both incoming and outgoing data. In addition, the SBus interrupt is programmable, thereby allowing the interrupt frequency to be adjusted based on current data transfer rates, the overall system environment and actual system loading. A control mechanism, preferably in the form of a state machine, is then implemented to control the interrupts to the main CPU in connection with capacity of each of the FIFO buffers, and to what extent each FIFO buffer may be filled, at any point in time, as a percentage of its maximum capacity.

For use on an SBus circuit card, the improved circuit can perform the address decode and transfer acknowledge required for an FCode PROM or NVRAM. For additional expansion or other enhancements, the improved circuit can provide the required decode and ACK signals for an additional read/write 8-bit device.

Finally, the communications circuit incorporates a multimode infra-red transmission and reception system which can handle modulation, demodulation and input multiplexing in order to be able to transmit and receive data in formats compatible with those currently in use, including those of multiple frequency modulation standards as well as current pulse modulation standards.

NOTATION AND NOMENCLATURE

Figure 1:
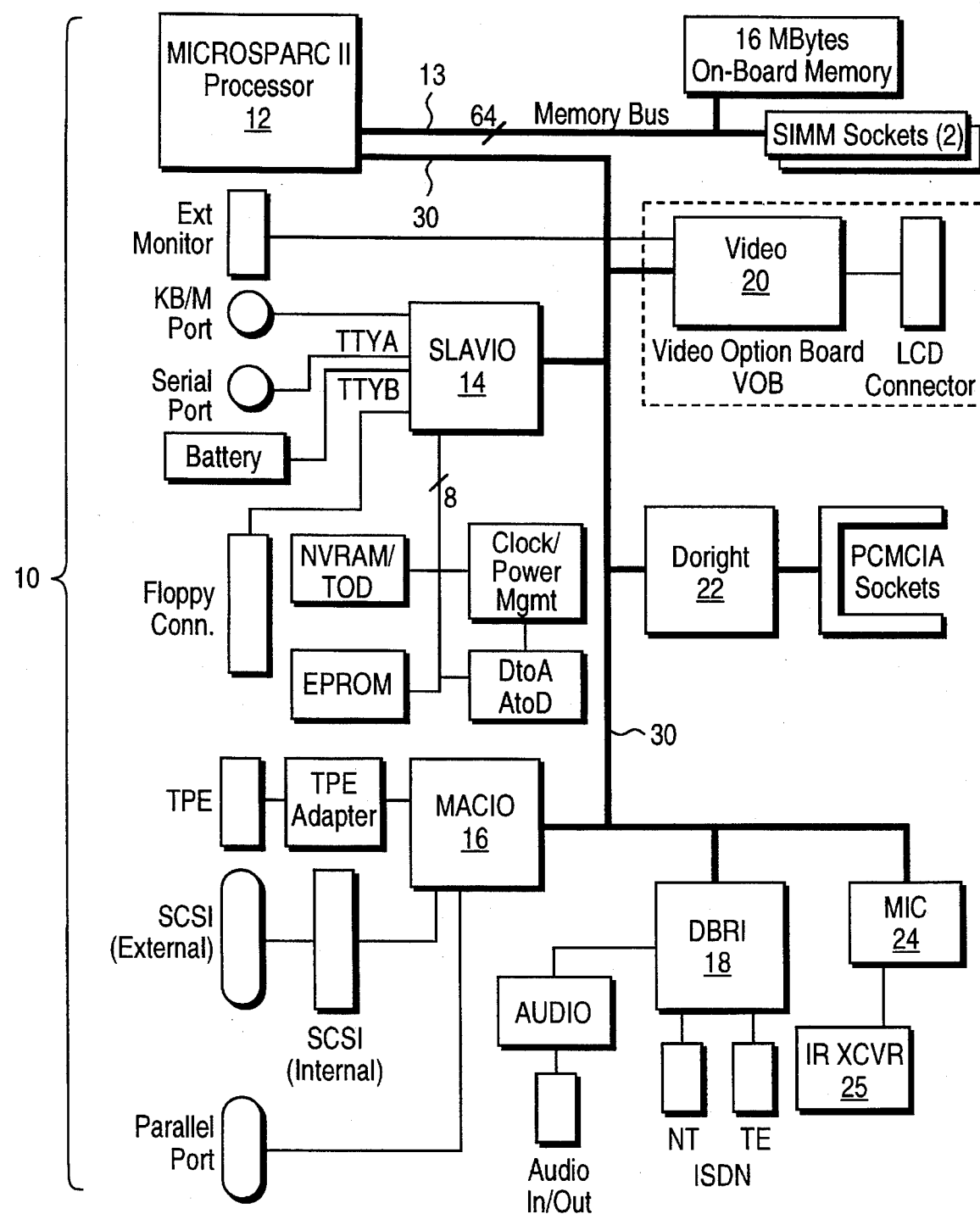
FIG. 1 is a block diagram of computer system which incorporates the asynchronous serial control circuit of the instant invention.

The detailed description that follows is presented largely in terms of algorithms and symbolic representations of operations on data bits and data structures within a computer memory. These algorithmic descriptions and representations are the means used by those skilled in the data processing arts to most effectively convey in substance their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bit patterns, values, elements, symbols, characters, data packages, or the like. It should be borne in mind, however, that all of these and similar terms are to be associated with the appropriate physical quantities and are merely convenient labels applied to these quantities.

Further, the manipulations performed are often referred to in terms, such as adding or comparing, that are commonly associated with mental operations performed by a human operator. No such capability of a human operator is necessary, or desirable in most cases, in any or the operations described herein that form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g. mechanical, chemical) physical signals to generate other desired physical signals.

The present invention also relates to an apparatus for performing these operations. This apparatus may be specially constructed for the required purposes, or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct a more specialized apparatus to perform the required method steps. The required structure for a variety of these machines will appear from the description given below.

DETAILED DESCRIPTION OF THE INVENTION

The asynchronous serial control circuit and infra-red interface of the instant invention is designed to be implemented on a new IEEE 1496-1993 standard SBus based workstation developed by Sun Microsystems, Inc. of Mountain View, Calif. The invention provides for improved serial communications through the use of FIFO buffered UART's, resulting in lower central processor overhead when processing incoming and outgoing serial data. The invention also provides for a flexible infra-red (IR) interface which allows for communications between, and the control of, personal information managers (PIM's), as well as other devices which may be controlled using an IR remote control. Detailed descriptions of the signals supplied in to and out of the invention are provided in the Appendix attached to this specification.

Referring first to FIG. 1, a block diagram of a computer system which incorporates the asynchronous control circuit of the instant invention, including multi-interface IR support, is shown. Although the details of each element of the total system architecture will not be described in detail, the system does embody an overall design which is well known by those skilled in the art. In particular the system is based around a MicroSPARC II processor, 12, which functions as a central processing unit (CPU). CPU 12 communicates with the rest of the system across an expandable memory bus, 13, which is preferably 64 bits in width, such as the IEEE standard 1496-1993 SBus, 30, developed by Sun Microsystems, Inc. of Mountain View, Calif. The disclosure of IEEE Standard 1496- 1993 is incorporated herein by reference.

The main control functions all communicate with CPU 12 across the SBus 30. These functions include the processing of general system input/output through the SLAVIO function, 14, which provides support for a system keyboard, mouse, floppy disk drive and other basic system functions including a time of day clock and power management. The system further includes a MACIO function, 16, which provides support for parallel devices, SCSI devices and TPE devices. A DBRI function, 18, is provided which supports audio input/output and also provides for an integrated ISDN telephone/data connection. Video support is provided through a VIDEO function, 20, which is designed to support both an external monitor as well as an alternative display device, such as a liquid crystal display panel. In order to support the expansion ports currently found in many laptop and palmtop computers the CPU 12 is further connected to a PCMCIA support circuit, 22, which may support multiple PCMCIA sockets. Finally, the improved architecture of the instant invention provides for a direct connection across the SBus 30, from the CPU 12, to an improved asynchronous serial control circuit (MIC) 24, which, as noted above, also incorporates an IR transceiver 25.

Figure 2:
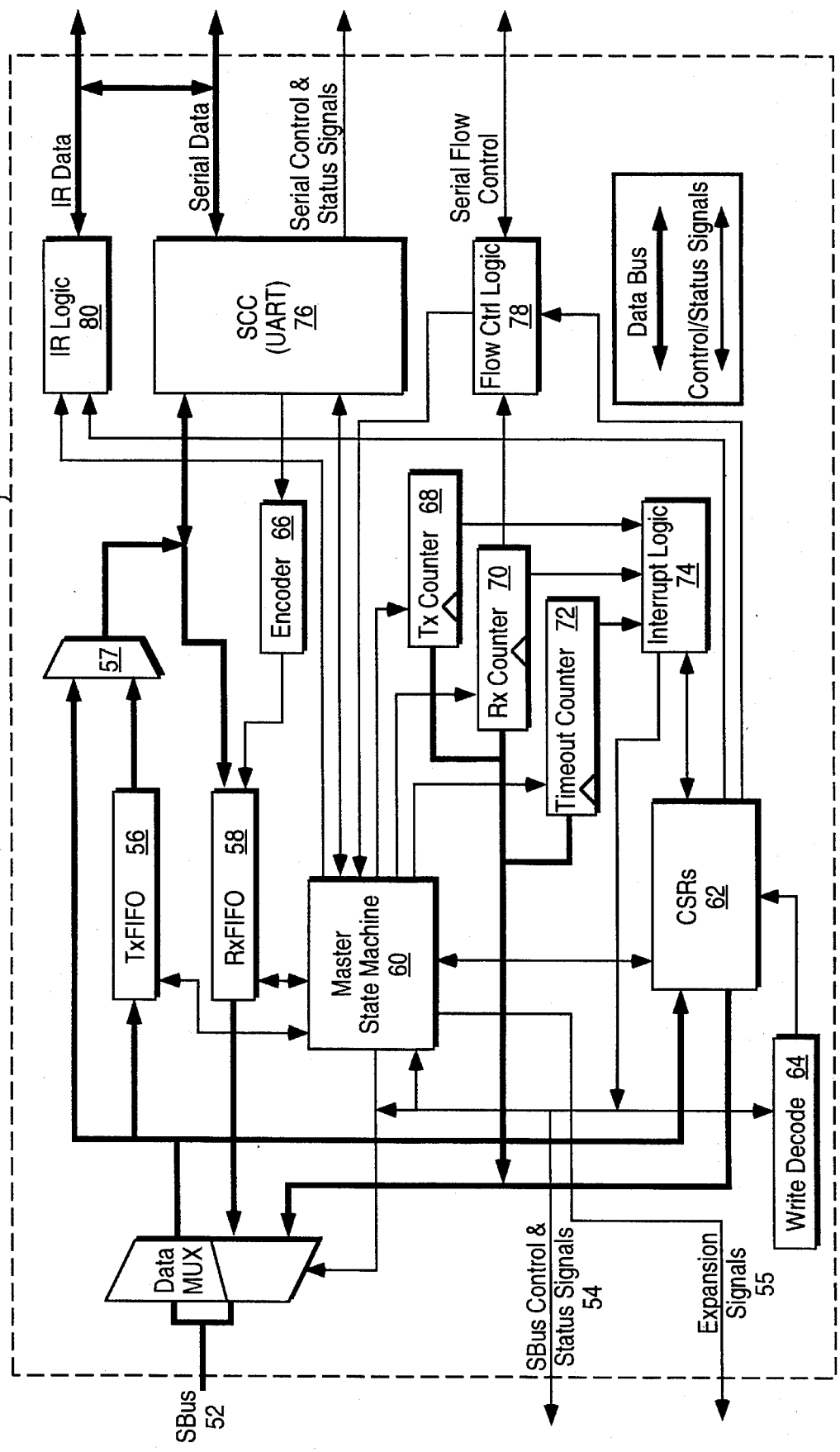
FIG. 2 is a block diagram of the serial control and data paths of the instant invention.

Turning next to FIG. 2, a block diagram further detailing MIC 24 is shown. In the preferred embodiment the systems includes two serial ports in addition to an IR port. However, in order to reduce the complexity of the illustration, only one serial port and the IR port is shown. The second serial would contain the identical connections.

As shown, MIC 24 supports a 16 bit SBus slave interface. The interface supports the following connections to the SBus, including signals transferred over SBus Data line 52 and SBus Control and Status Signal line 54:

| data | [15:0] | [bidirectional] |
| addr | [3:0] | [input] |
| func | [2:0] | [input] |
| siz | [2:0] | [input] |
| as_ | | [input] |
| ack_ | [2:0] | [output] |
| sb_rst_ | | [input] |

| | |
|---|---|
| sb_clk | [input] |
| sel_ | [input] |
| intreq_ | [output] |
| rd | [input] | and further supports memory expansion connections over expansion signal line 55, including

| | |
|---|---|
| mem_rd_ | [output] |
| mem_wr_ | [output] |
| expan_cs_ | [output] |

Byte, Half-Word and Word transfers may be initiated by the SBus master, but MIC 24 will always respond with either a Byte or Half-Word acknowledgement. This functionality is shown in the following chart of the MIC ADDRESS SPACE (func [2:0]):

| FUNC. INPUT | FUNCTION SELECTED | SUPPORTED TRANSFERS | ACKNOWLEDGEMENT |
|---|---|---|---|
| 000 | Prom/NVRAM | Read/Write | Byte |
| 001 | Status Register Set A | Read Only | Half-Word |
| 010 | Control Register Set A (except Address 0x8) | Read/Write | Half-Word |
| 010 | Transmit FIFO A (Address 0x8) | Write Only | Byte |
| 011 | SCC Register Set A | Read/Write | Byte |
| 100 | Expansion Bus | Read/Write | Byte |
| 101 | Status Register Set B | Read Only | Byte |
| 110 | Control Register Set B (except Address 0x8) | Read/Write | Half-Word |
| 110 | Transmit FIFO B (Address 0x8) | Write Only | Byte |
| 111 | SCC Register Set B | Read/Write | Byte |

When the initiated transfer size is greater than the acknowledge size, the SBus master is forced to perform dynamic bus sizing. When a Byte transfer is initiated on the Status or Control Lines 54 the Sbus master is forced to transfer the data on the byte port 52. Burst or Extended transfers will be responded to with an Error Acknowledgement. A write request to transmit FIFO 56, when it is full, will also receive an Error Acknowledgement.

The invention also provides support for connecting 8 bit devices to the SBus. This is accomplished through the use of three signals transmitted along the Expansion Signals line, 55. These three signals are mem_rd_, mem_wr_, and expan_cs. When an SBus read of the PROM/NVRAM address space is initiated (using SBus control instruction 000), the invention drives the mem_rd_ line low. After 6 clocks, the circuit provides a byte transfer acknowledge to the SBus. This long acknowledgement time allow for the use of PROM's with worst case access times of 280 ns or less on a 25 Mhz SBus. At the completion of the SBus cycle, mem_rd_ is driven high. An SBus write to PROM/NVRAM address space then causes the mem_we_ signal to be asserted, and a byte acknowledgement to be returned. In one embodiment the mem_rd_ line may be connected to the output enable of a PROM or in the case of an NVRAM, the mem_rd_ and mem_wr_ signals may be used together to perform SBus reads and writes.

When an SBus transfer of the Expansion address space is initiated (using the function 100 noted in the chart above), the invention drives the expan_cs_ line low. The expansion device may use the SBus rd line to determine the transfer direction. Then, after 6 clocks, the circuit provides a byte transfer acknowledge to the SBus.

Moving to the right hand side of FIG. 2, the IR logic 80 interface portion of MIC 24 is shown. This circuitry is also shown in greater detail in FIG. 3. As described above, the control circuit provides an IR interface for the support of both frequency modulation and pulse modulation transmission and reception protocols. In a preferred embodiment the complete IR system comprises two parts: the digital logic portion and the analog modulation/demodulation portion. Preferably all of the digital logic may incorporated directly into MIC 24, while the analog components may be external, in order to increase system flexibility and permit the incorporation of new modulation standards in the future. The IR logic is controlled by two registers, IR_MODE and IR_DIVISOR. IR_MODE controls the type of modulation/encoding for transmission and reception (FM or PM), while the IR_DIVISOR controls the frequency of modulation when IR_MODE is in FM mode.

Figure 6:
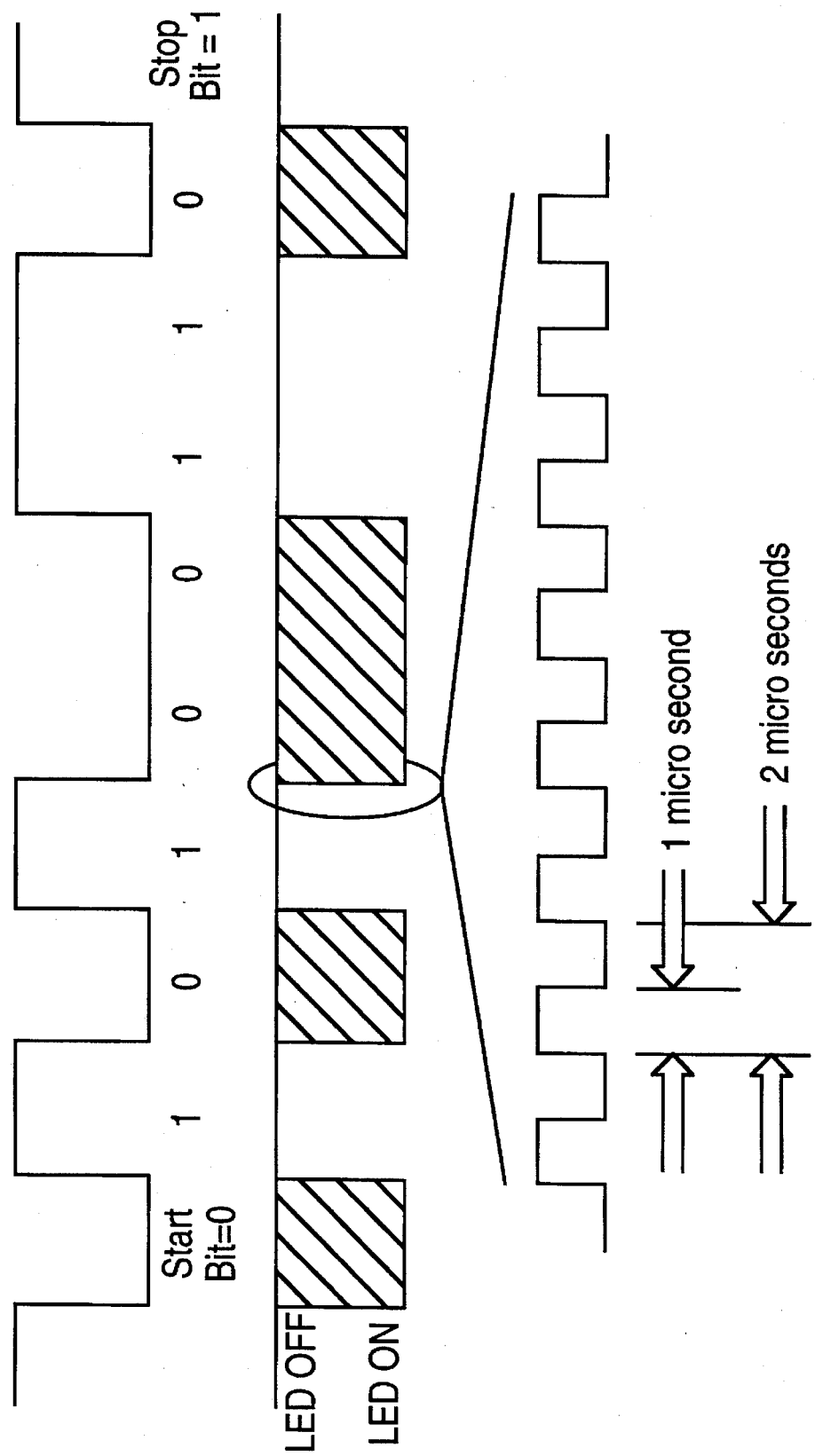
FIG. 6 is a timing diagram illustrating a sample frequency modulated infra-red waveform.

Looking first at signal encoding, with respect to FM operation, an asynchronous serial bit stream is "OR'ed" with a single frequency modulation in order to arrive at an output signal. An example of such modulation is illustrated in FIG. 6. As shown, the FM signal may typically have a range of between 20 kHz to 500 kHz, with 500 kHz being typical for current PIM communications, while 20 kHz to 100 kHz is typical for consumer remote controls. In practice this type of modulation is simple to perform. As illustrated the IR signal is turned off during the "1" bit times and during the 'spacing' period of the serial signal to be encoded. During the "0" bit times, which includes the start bit, the IR signal is turned on and off at the modulation frequency. The modulation circuitry needed to implement such a scheme is simply an OR gate coupling the modulation frequency signal with the serial data signal.

Figure 7:
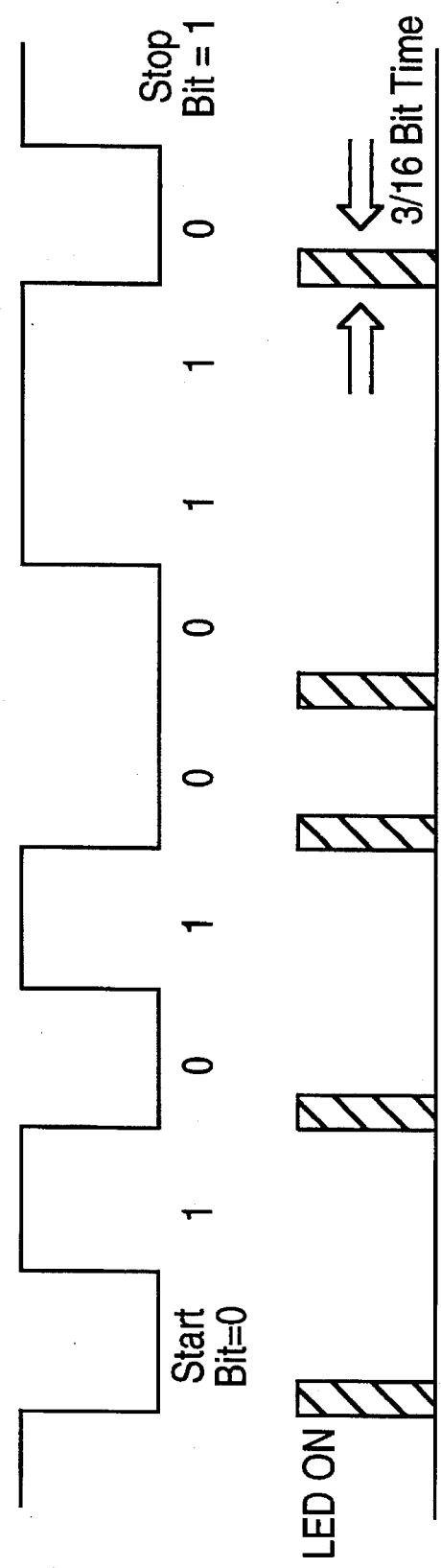
FIG. 7 is a timing diagram illustrating a sample pulse modulated infra-red waveform.

With respect to pulse modulation, as illustrated in FIG. 7, the IR signal is turned on for 3/16th of the bit period during any "0" bit, which includes the start bit. The modulation circuitry within the circuit to implement this functionality consists of a state machine which is preferably clocked at 16 times the bit rate. The input to the state machine is the normal asynchronous serial output from the UART 76. The state machine looks for a "0" bit, puts out an active signal for 3/16 bit time, and returns the output to the inactive state for the remainder of the bit period.

Turning to the process of IR signal decoding, in the case of frequency modulated signal reception, the decoding process is performed by the analog receiving circuitry, so the signal being input into the MIC circuit 24 will appear as a standard, asynchronous serial signal.

In the case of reception of a pulse modulation signal, the signal will also appear to be an asynchronous serial signal, except that the "0" bits will be active for only the first 3/16th's of the bit time. Therefore a bit-stretching function is required. The decoding circuit includes a state machine which employs an input latch to catch an active going "0" signal, and generates an output pulse which lasts for a full bit time. Halfway through the output pulse, the latch is reset to catch any pulses which may deviate from the nominal bit rate. If no active going edge has been caught before the end of the bit time, the state machine assumes that the bit is now a "1" bit, and resets itself to continue looking for the "0" edge.

Since the output of the decoder is the input for UART 76, the UART will be looking for a starting edge, then interpolating to the center of the nominal bit period, and sample the input signal at the nominal bit center. This will obviate any small glitches if, for example, a sequential series of "0" bits are received, and the actual bit time is slightly longer than in the receiving circuit if, for example, there is a clock mismatch between the sending device and the receiving circuit. In this case there will be brief, erroneous "1" states at the beginning of each nominal "0" bit time, after the first one. Due to the center point sampling of the UART, these glitches will not be detected unless the clock mismatch exceeds the level normally tolerated by asynchronous devices.

Figure 3:
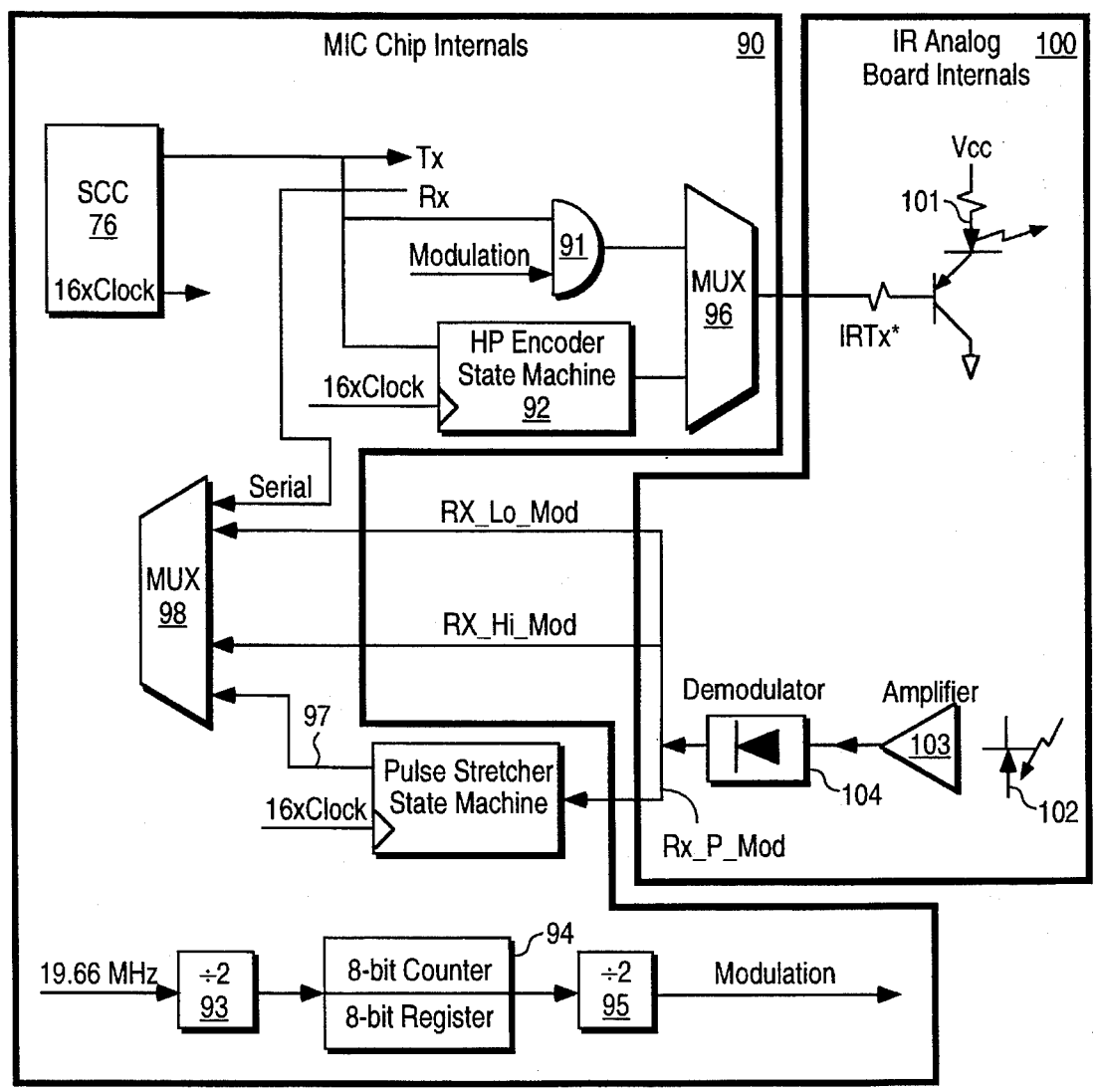
FIG. 3 is a block diagram of the infra-red control circuitry of the instant invention.

A block diagram of a circuit which may perform the above noted IR processes is provided in FIG. 3. As illustrated, the IR block may be broken down into two subsystems, a digital processing portion internal to the circuit of the invention 90 and an analog portion which may be external 100. Looking first at the internal digital circuitry, data is brought into and out of the system through an SCC (UART) 76. This circuit has a TX output which is either brought straight, for standard serial communications, or is brought into a modulation gate 91 or HP encoder state machine 92. As discussed above, in the case of transmission of data as illustrated in FIG. 6, the modulation frequency to be mixed against the serial data to be transmitted is combined in modulation gate 91. This modulation signal may be generated in any suitable manner. In a preferred implementation this signal is provided in the chain illustrated through elements 93, 94 and 95, which provides a suitable modulation signal derived from an 19.66 MHz clock. On the other hand, when the modulation scheme to be employed is compatible with the shortened pulse system illustrated in FIG. 7, the serial signal to be transmitted is used to drive an HP encoder state machine 92. The output of gate 91 or state machine 92 is then used to drive a multiplexer 96 which, in turn, drives an IR element and associated support circuitry 101.

In the case of the reception of data, an IR signal is received by a detector 102. The output of this detector is conditioned through an amplifier 103 and then demodulated by demodulator 104. As illustrated, the output of demodulator 104 is routed in a number of ways depending on the type of data received. In the case of a Frequency Modulated signal, the data may be from a consumer IR signal (rx_lo_mod); a high frequency signal, such as one supplied from an Apple Newton PIM (rx_hi_mod); or a pulse modulated signal such as one supplied from a Hewlett-Packard PIM (rx_p_mod). In the case of a Pulse Modulated signal, such as one supplied from an HP 95LX, as illustrated in FIG. 7 and described above, before the serial data can be supplied to SCC (UART) 76, it must first be 'stretched' into a duty cycle which is compatible. This is done in a pulse stretcher state machine 97, the output of which is then provided to a multiplexer 98. Multiplexer 98 then is used to control the input from all the noted serial data signals, including a standard hard wired serial data connection, into SCC (UART) 76.

Returning to FIG. 2, the flow logic control portion of the MIC asynchronous serial communications circuit 24 is examined. An advantage of the instant invention is that, unlike other serial solutions, the instant invention supports automatic serial hardware flow control, including RTS and CTS. In order for this feature to be activated, the RTS Automatic Control Register and the CTS Automatic Control Register must both be enabled.

Rts_ is a status output signal which controls the transmitter of the connected serial device. When the RTS_AUTO_EN register is reset low (rts auto control disabled), the rts_ line is controlled manually by the RTS_STAT register. However, when the RTS_AUTO_EN register is set high, rts_ is automatically controlled by the inventions control logic. During auto rts control, if the receive FIFO count becomes greater than or equal to 61, rts_ is disabled (driven high). The connected serial device may transmit 3 additional data bytes before overflowing the receiving UART. Rts_ will then stay disabled until the receive FIFO count is less than 61.

Cts_ is a control input which can be set to directly control the transmission of data from the invention's serial port. When the CTS_AUTO_EN register is reset low, the invention's transmitter is always enabled, and the cts_ line is ignored. However, if the CTS_AUTO_EN register is set high, cts_ will control the transfer of data from the transmit FIFO to the respective UART. If the cts_ line is disabled, the invention's control logic will stop transferring data to the respective UART. There can be up to 2 bytes of data already in the UART, which will continue to be shifted out of the transmit port. Once the remaining data in the UART has been transmitted, data transmission will cease until the cts_ line again goes active.

Also illustrated in FIG. 2, the MIC circuit 24 further incorporates a built in time out feature to reduce the interrupt frequency. To be effective it must be used with a receive water mark detector having a detector level of greater than one. The Timer Set Count Register is used to load the respective Receive Timer. The Receive Timer is loaded when a byte is pushed into the respective RX FIFO. It is decremented with each SBus clock until it reaches zero or is set with a new received data byte. If the Receive Tuner reaches zero before the receive water mark level is reached, then a Receive Timeout Interrupt is set.

Finally, as illustrated in FIG. 2, an SCC (UART) Serial Controller is shown. Although only one SCC device is illustrated, in practice two devices, A and B are provided, one for each port. Because the SCC's (UART's) have an 8 bit data bus, all data transfers between the SBus and the SCC's (UART's) are done on the most significant byte of control circuit's half word data bus. For greater detail on the 16C450 Megafunction, refer to the LSI cfn0451 a Specification. In addition, for an in-depth explanation of the 16C450 register set and general operation reference is made to National Semiconductor's 16C450 (16C550) Specification.

As noted above, in the instant invention the MIC circuit incorporates a master state machine 60, which provides control to the IR Logic 80, the SCC UART 76, Flow Control Logic 78, Transmit Counter 68, Receive Counter 70, Timeout Counter 72, Expansion Signals 55, Transmit FIFO 56, and Receive FIFO 58 (which also receives as an input a signal from Encoder 66, which is used to encode the data status signals from the SCC (UART) into a 3 bit code, described as the DAT_STAT bits in the Appendix.) Master state machine 60 also communicates with data from the SBus 52, and with CSR (Control and Status Registers) 62.

Write Decode block 64 is used during an SBus write to determine, or decode which CSR to write based upon the addresses received.

Figure 4:
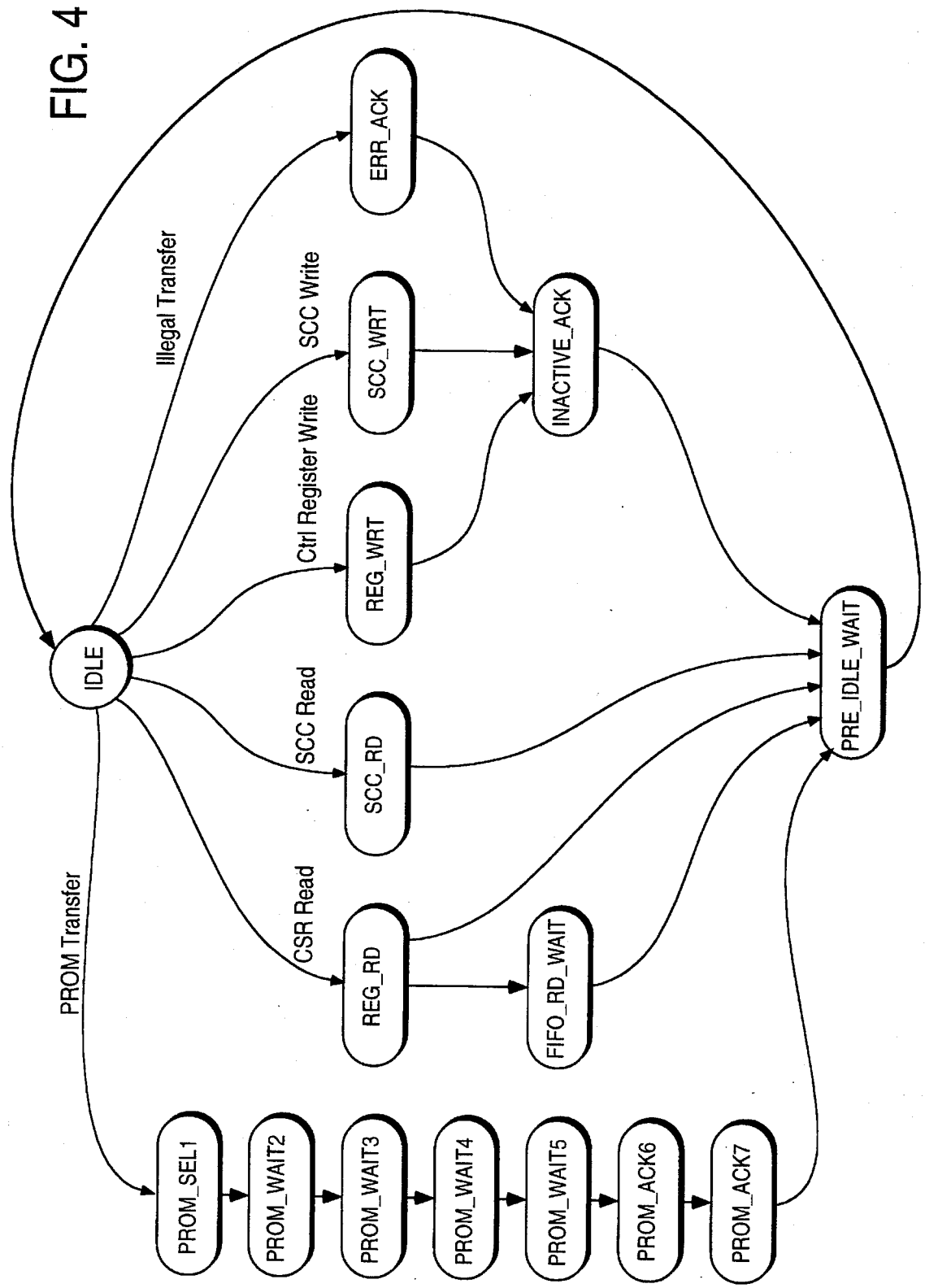
FIG. 4 is a state diagram illustrating SBus transfers in accordance with the instant invention.
Figure 5:
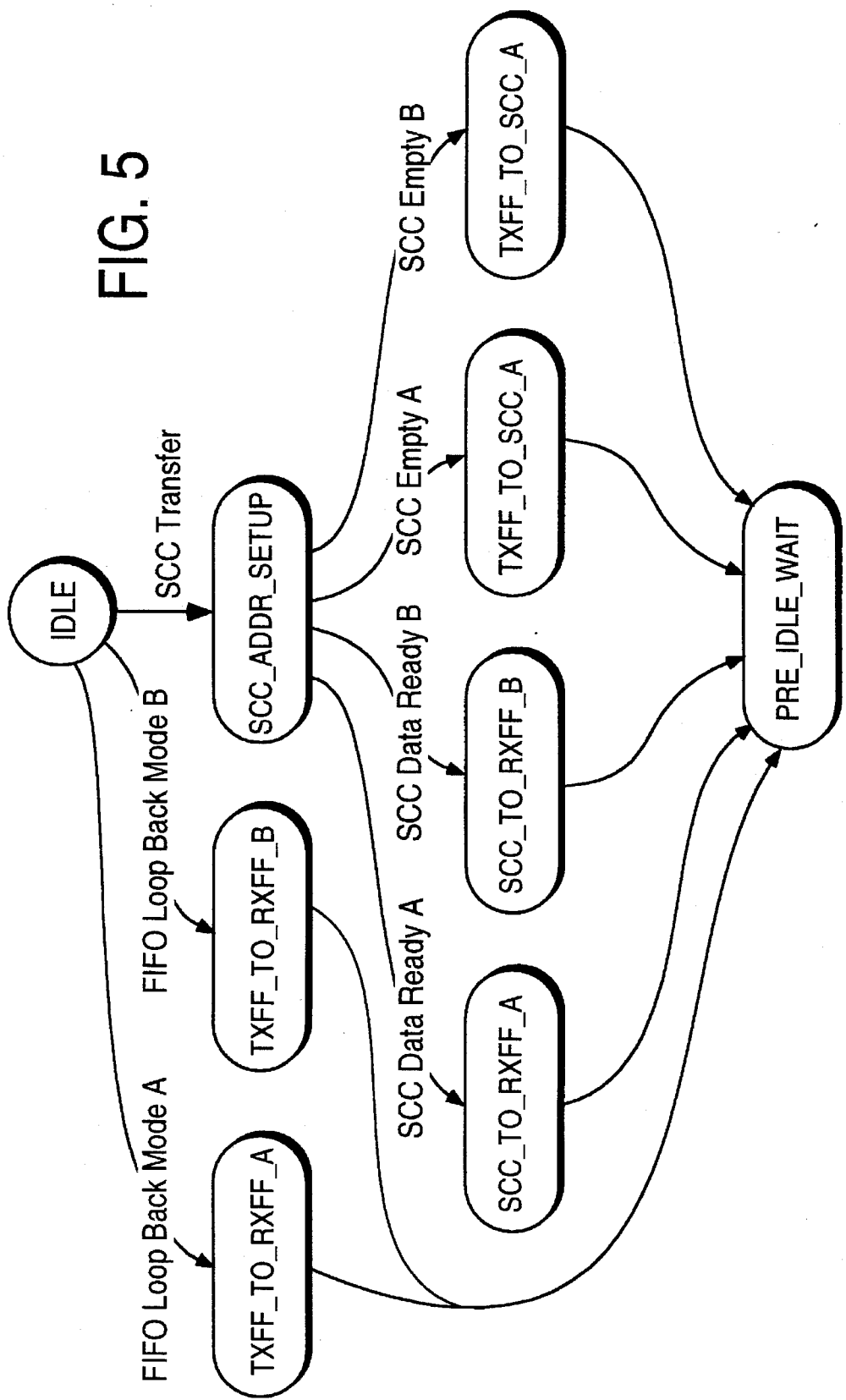
FIG. 5 is a state diagram illustrating internal data transfers in accordance with the instant invention.

FIG. 4 illustrates a state diagram for transfers from the invention on to and off of the SBus. Shown are the execution states for a PROM transfer, a CSR Read, an SCC (UART) Read, a Control Register Write, an SCC (UART) Write, and the state for an illegal (error) transfer. FIG. 5 illustrates a state diagram for data transfers within the invention. Shown here are the states for the FIFO A Loop Back Mode, the FIFO B Loop Back Mode, and an SCC (UART) Transfer which further includes those states where the data in SCC (UART) A is ready, the data in SCC (UART) B is ready, SCC A (UART) is empty and SCC (UART) B is empty.

FIGS. 4 and 5 illustrate the states of the Master State Machine (MSM) 60. As illustrated, with the exception of the IDLE state, MSM 60 never remains in one state for more than one sb_clk. Only one transfer can occur at one time (SBus or Internal).

The following is the priority the MSM gives to the transfers (1 highest priority).
1. SCC to RX FIFO Transfer A
2. SCC to RX FIFO Transfer B
3. TX FIFO to RX FIFO Transfer A
4. TX FIFO to RX FIFO Transfer B
5. TX FIFO to SCC Transfer A
6. TX FIFO to SCC Transfer B
7. CSR Read, Control Register Write, SCC Read, SCC Write, Illegal Transfer.

It is noted that the SBus will only initiate one type of SBus transfer at a time. Therefore all SBus transfer types have the same priority.

FIG. 4 shows all the states associated with SBus Transfers. From the IDLE state, there are 6 transfer paths that can be taken. Movement from the IDLE state is initiated when the SBus sel_ and as_ inputs are asserted. The path taken is controlled by the SBus addr[3:0], func[2:0], and rd inputs. The following is a description of each path.

PROM TRANSFER

When a PROM or Expansion transfer is initiated, the MSM jumps to the PRO_SEL1 state. While in this state, depending on the SBus func[2] and rd inputs, the mem_rd, mem_wr, or expans_cs output pin is driven active. The following equations are used to determine which output to assert:

```
mem_rd_   =! ( rd & & !func[2] )
mem_w_r   =! ( ! rd & & !func[2] )
expan_cs_ =! ( func[2] );
```

With each sb_clk, the MSM moves through the PROM transfer path, to PROM_WAIT1, PROM_WAIT2, PROM_WAIT3, PROM_WAIT4, PROM_WAIT5, PROM_ACK6, then PROM_ACK7. While traveling through the "WAIT" states, the mem_rd_, mem_wr_, and expans_cs_ output pins are driven as described above. In PROM_ACK6, the SBus ack_[2:0] outputs are driven with the Byte Ack code. Also in this state, if the transfer is a write, the mem_wr_ and expans_cs_ are driven inactive. In PROM_ACK7, the SBus ack_ [2:0] outputs are driven inactive. On the next sb_clk, the MSM goes to PRE_IDLE_WAIT. This state is used to give the SBus one cycle to de-assert the as_ and sel_ signals before going to the IDLE state.

CSR READ

When the Control or Status Register address space is read, the MSM goes to the REG_RD state. During this state, the Data Output Mux drives the control or status register selected by the addr[3:0] and func[2:0] inputs onto the data[15:0] outputs.

Additionally, the SBus ack_[2:0] outputs are driven with the Half-Word Ack code. In the following state the SBus ack_ [2:0] outputs are driven inactive. If the RX FIFO data address is selected, then the RX FIFO is popped and the MSM goes to the FIFO_RD_WAIT state. Otherwise, the MSM goes to the PRE_IDLE_WAIT state. The FIFO_RD_WAIT state is to allow the RX FIFO status signals enough time to stabilize before another SBus read is issued.

SCC READ

When the SCC Address space is read, the MSM goes to the SCC_RD state. During this state the SCC data bus is driven onto the SBus data [15:8] output pins. Additionally, the SBus ack_[2:0] outputs are driven with the Byte Ack code. In the following state, PRE_IDLE_WAIT, the SBus ack [2:0] outputs are driven inactive.

CONTROL REGISTER WRITE

When the Control Register address space is written, the MSM goes to the REG_WRT state. During this state, the Write Decode Logic latches the SBus data inputs in to the selected register. In the following state, if the TX FIFO is selected, the SBus ack_[2:0] outputs are driven with the Byte Ack code. Otherwise, the SBus ack_[2:0] outputs are driven with the Half-Word Ack code. On the following sb_clk, the MSM goes to the INACTIVE_ACK state. In this state, the SBus ack_[2:0] outputs are setup to be driven inactive in the following state.

SCC WRITE

When the SCC Address space is written, the MSM goes to the SCC WRT state. During this state, the SBus data inputs are multiplexed onto the SCC data bus. In the following state, the data is latched and the Byte Ack code is driven.

ILLEGAL TRANSFER

When an illegal SBus transfer is attempted, the MSM goes to the ERR_ACK state. Illegal transfer types are: a write to a full TX FIFO, a write to a Status Register, Burst or Extended SBus transfers. While in the ERR_ACK state, the SBus ack_[2:0] outputs are setup to be driven with the SBus Error Ack code in the following state.

FIG. 5 shows all the states associated with Internal Data Transfers. Each internal transfer type has two paths, one for each port (A and B). The following is a description of each type. Since the transfers types for the A and B ports are identical, each transfer type will be described only once.

TX FIFO TO RX FIFO TRANSFER

As a test mode, the TX FIFOs can be setup to loop back data to the RX FIFOs. If this TXFF_TO_RXFF test mode is set and there is data in the TX FIFO, then the MSM goes to the TXFF_TO_RXFF state. During this state, the RX FIFO is pushed with the data from the TX FIFO. In the following state, the TX FIFO is popped. The MSM goes to the PRE_IDLE_WAIT state so that all the status signals from the FIFOs and SCC's can stabilize before going to the IDLE state.

SCC TO RX FIFO TRANSFER

When the SCC has received data ready, the MSM begins an SCC to RX FIFO transfer. As with all internal SCC data transfers, the address going to the SCC must be switched to 0. This is done in the SCC ADDR SETUP state. Then the MSM goes to the SCC_TO_RXFF state. During this state, the received data is read from the SCC and pushed in to the RX FIFO.

TX FIFO TO SCC TRANSFER

When the SCC transmit buffer is empty and data is available in the TX FIFO, the MSM begins a TX FIFO to SCC transfer. After the SCC address has been set in the SCC_ADDR_SETUP state, the MSM goes to the TXFF_TO_SCC state. During this state, the top TX FIFO data is written in to the SCC. In the following state, the TX FIFO is popped.

In operation, data to be transmitted from the system out across a serial port (either hard wired or IR) is first buffered by TX FIFO 56. Control of this FIFO is performed by the Master State Machine 60. This data is then routed to the SCC (UART) 76 and processed as described. (Although a direct connection is shown between the SBus data line 52 and a multiplexer 57, in practice this connection is used only the program the SCC (UART) registers, while the TX FIFO 56 is always used only for data.) A similar flow is found on the receive side where information received into SCC (UART) 76 is coupled to RX FIFO 58, which is also under the control of Master State Machine 60. An advantage of the buffering found in this implementation, when compared to the internal buffering available, for example, in the National 16550 UART is that while in the 16550 the internal buffer has storage for 16 bytes the size of RX FIFO 58 as implemented externally has storage for 64 bytes. In addition, since RX FIFO 58 is external to SCC (UART) 76, it is anticipated that modifications to the invention may provide for greater storage in RX FIFO 58 in order to further reduce the need for the CPU to process data and interrupt requests. In addition to being larger in size, RX FIFO 58 is also more flexible in that under the control of Master State Machine 60, various schemes may be implemented to optimize system throughput while minimizing interrupt requests. This can be accomplished in connection with TX Counter 68, RX Counter 70 and Timeout Counter 72. In one embodiment it is recommended that an interrupt be generated only every 30 characters. This may be measured and controlled by RX Counter 70. However, in the case of data received slowly (such as from an external IR keyboard), 30 characters may take many seconds (or more) to be received. In such a case Timeout Counter 72 will then be used in addition to RX Counter 70 to force an interrupt to occur before 30 characters have been received, in order to smooth the user interface.

Therefore, as can be seen from the foregoing, by using the teachings of the invention an improved serial control circuit may be provided which includes support for multiple IR protocols. Using the improved serial control circuit results in the need for fewer components, the need for less physical space on a printed circuit board, lower power consumption and lower construction and implementation costs. While in a preferred embodiment the functionality of the invention is embodied in a single integrated circuit, it is anticipated that multiple devices may also be used, or that functionality may also be simulated through the use of a universal processing engine and appropriate control instructions. Finally, using the instant invention an improvement over devices currently on the market is realized in that a direct connection to an IEEE SBus is provided, obviating the need for hardware and software to 'translate' signals and data between a generic bus and the SBus.

In the foregoing specification, the invention has been described with reference to specific exemplary embodiments thereof. It will, however, be evident that various modifications and changes may be made thereto without departing from the broader spirit and scope of the invention as set forth in the independent claims. The specification and drawings are, accordingly, to be regarded as illustrative, rather than in a restrictive sense.

APPENDIX - SIGNALS

SBUS INTERFACE

| NAME | I/O | DESCRIPTION |
|---|---|---|
| data[15:0] | in/out | SBus Data |
| addr[3:0] | in | SBus Address Bus |
| func[2:0] | in | Function Select. Wired to SBus address bits |
| siz[2:0] | in | Transfer Size |
| rd | in | Transfer Direction |
| as_ | in | Address Strobe |
| ack_[2:0] | out | Transfer Acknowledgement |
| sb_rst_ | in | SBus Reset |
| sb_clk | in | SBus Clock |
| sel_ | in | Slave Select |
| interq_ | out | Interrupt Request |

SERIAL CONTROLLER CLOCK

| | | |
|---|---|---|
| scc_clock | in | SCC (UART) Clock |

SERIAL PORT A (similar for port b)

| | | |
|---|---|---|
| rxd_a | in | Receive Serial Data A |
| txd_a | out | Transmit Serial Data A |
| cts_a | in | Clear to Send A |
| rts_a | out | Request to Send A |
| dcd_a | in | Data Carrier Detect A |
| dtr_a_ | out | Data Terminal Ready A |

APPENDIX - SIGNALS

| | | |
|---|---|---|
| dsr_a | in | Data Set Ready A |
| out1_a_ | out | Out 1 A |
| ri_a_ | in | Ring Indicator A |
| out2_a_ | out | Out 2 A |
| baud_clk_a | out | Baud Clock A |

IR INTERFACE

| | | |
|---|---|---|
| tx_ir | out | IR Transmit Port. Encoded IR Signal to be transmitted |
| rx_p_mod | in | IR Receive Port. Pulse Modulation protocol to be decoded by system |
| rx_lo_mod | in | IR Receive Port. Low Frequency Modulation. Standard serial data format |
| rx_hi_mod | in | IR Receive Port. High Frequency Modulation. Standard serial data format |

PROM/Expansion Interface

| | | |
|---|---|---|
| mem_rd_ | out | PROM/NVRAM Read |
| mem_wr_ | out | NVRAM Write |
| expans_cs_ | out | Expansion Bus Chip Select |

CONTROL LOGIC STATUS REGISTER SUMMARY

| NAME | REGISTER NAME |
|---|---|
| SB_INT_ID | SBus Interrupt, ID Register |
| ISR | Interrupt Source Register |
| FF_CNT | Transmit and Receive FIFO Count Register |
| TMO_CNT | Timeout Count Register |
| RXFF | Receive FIFO Data and Status |

CONTROL REGISTER SUMMARY

| | |
|---|---|
| GEN_IE | General Interrupt Enable Register |
| FLW_CNL | Flow Control Register |
| WATR | Transmit and Receive Water Mark Level Register |
| TMR_SC | Timer Set Count |
| MISC_CNL | Miscellaneous Control Register |
| TST_CNT | Test Control Register |
| TXD | Transmit FIFO Data |
| IR_DIVISOR | IR Modulation Divisor Register |
| IR_MODE | IR Mode Register |

INTERRUPT SOURCE REGISTER

| | |
|---|---|
| TX_EMPTY_INT | SCC (UART) Transmitter Empty Interrupt. Set high when both the SCC transmit holding register and transmit shift register are empty. |
| SCC_INT | SCC Interrupt. Set high when an SCC interrupt is set. This can occur when there is a transition on dsr_ or dcd_ or with the falling edge of ri_a_. The Modem Status Register in the respective SCC should be read to determine the source and clear the interrupt. |
| RX_TIMEOUT | Receive Timeout is set high when the Receive Timer is zero and the RX FIFO is not empty. See TMR_SC registers. Reset when the RX FIFO is read. |
| RX_WATR_INT | Receive Water Mark Interrupt. Set high when the count of the Receive FIFO is greater than or equal to RX_WATR_LVL register. Reset when the count of the RX FIFO is less than the RX_WATR_LVL register. |
| TX_WATR_INT | Transmit Water Mark Interrupt. Set high when the count of the transmit FIFO is less than or equal to the TX_WATR_LVL register. Reset when the count of the TX FIFO is greater than the TX_WATR_LVL register. Note: On reset, the TX FIFO will be empty and the TX_WATR_LVL will be zero. Therefore, although this register's reset state is 0, it goes high quickly after activation. |

FIFO COUNT REGISTER

| | |
|---|---|
| RX_CNT | Receive FIFO Count Register. Gives the current number of data bytes in the respective receive FIFO. |
| TX_CNT | Transmit FIFO Count Register. Gives the current number of data bytes in the respective transmit FIFO. |

RECEIVE FIFO

| | |
|---|---|
| DAT_STAT | Receive Data Status Register. Gives the status of the data in RXD. Invalid (FIFO Empty)=000; Valid (No Errors)=001; Framing=010; Parity=011; Parity & Framing=100; Break=101; Overrun=110; Undefined=111. The priority is 6 to 0. For example, if a Overrun occurs at the same time as a parity error, the code would be 6 or Overrun. The parity error would be ignored. |
| RXD | Receive FIFO Data. A read pops the data off the top of the respective receive FIFO. |

GENERAL INTERRUPT ENABLE REGISTER

| | | |
|---|---|---|
| TX_EMPTY_IE | Transmit Empty Interrupt enable for the respective SCC | Read/Write |
| RX_TMOUT_IE | Receive FIFO time_out interrupt enable for the respective port | Read/Write |
| RX_WATR_IE | Receive FIFO watermark interrupt enable for the respective port | Read/Write |
| TX_WATR_IE | Transmit FIFO watermark interrupt enable for the respective port | Read/Write |
| MSTR_IE | Master interrupt enable for the respective port | Read/Write |

APPENDIX - SIGNALS

FLOW CONTROL REGISTER

| | |
|---|---|
| CTS_STAT | CTS Status Register. Status of cts_pin [Read Only] |
| CTS_AUTO_EN | CTS Automatic Enable Register. When set high the Control Logic will automatically control the respective SCC transmitter, based on the cts_line. When CTS_AUTO_EN is reset low, the transmitter is always enabled, regardless of the cts_ level. [Read Only] |
| RTS_STAT | RTS Status Register. A read always reflects the state of the rts_ line. When RTS_AUTO_EN is low, a write will control the logic level of the rts_ line. When RTS_AUTO_EN is high, a write will be ignored. [Read/Write] |
| RTS_AUTO_EN | RTS Automatic Control Enable Register. When set high, the Control Logic will automatically control the rts_ line. When the RTS_AUTO_EN register is reset low, the RTS_STAT register becomes the controller of the rts line level. [Read/Write] |

WATER MARK LEVEL REGISTER

| | |
|---|---|
| RX_WATR | Receive FIFO Water Mark level. The number of bytes in the RX FIFO at which a SBus interrupt is set. [Read/Write] |
| TX_WATR | Transmit FIFO Water Mark level. The number of bytes in the TX FIFO at which a SBus interrupt is set. |

Note: If a RX_WATR value of 1 is used, the RX_WATR Interrupt will not clear until one clock after the receive FIFO is read.

TIMER SET COUNT

| | |
|---|---|
| TMR_SC | Timer Set Count Register port. [Read/Write] |

MISCELLANEOUS CONTROL REGISTER

| | |
|---|---|
| SCC_PROG_MODE | This register must be set high before the respective Divisor Latch Access Bit(DLAB) is set high. The DLAB is in the Line Control Register of the SCC Register Set. While SCC_PROG_MODE is high, no data will be transferred between the FIFOs and the SCC. This bit must be reset low after the DLAB is reset low to allow data to be transferred. [Read/Write] |
| CLR_RX | Clear receive FIFO. When set high, will clear RX FIFO of all data, which resets the RX_WATR_INT and/or RX_TMR_INT, if they have been set. [Read/Write] |
| CLR_TX | Clear transmit FIFO. When set high, will clear TX FIFO of all data, then reset itself. [Read/Write] |

TRANSMIT FIFO DATA

| | |
|---|---|
| TXD | Transmit FIFO Data. [Write Only] |

IR DIVISOR (PORT A ONLY)

| | |
|---|---|
| IR_DIVISOR | Transmit IR Divisor. This register is used to control the clk divider for the IR transmit modulation. The modulation frequency is: Frequency = (scc_clk frequency) / (4 X IR_DIVISOR +1)) Given an scc_clk frequency of 19.66 MHz, this gives a frequency range of 4.9 Mhz to 19.2kHz. With a divisor of 9, the modulation frequency would be 491.1kHz ~=500kHz. [Read/Write] |

IR MODE (PORT A ONLY)

| | |
|---|---|
| RxMode | Serial Port Receive Mode. This register controls which received serial signal is muxed into the input of SCC A. 00 -> rxd_a 01 -> rx_p_mod 10 -> rx hi mod 11 -> rx_lo_mod [Read/Write] |
| TxMode | IR Tx Mode. This register selects the transmit mode of the tx_ir output. 00 -> inactive 01 -> pulse modulation 10 -> hi frequency modulation 11 -> lo frequency modulation Note: Mode 10 & 11 are really the same. The transmit frequency is controlled by the IR_DIVISOR register. |

16C450 SCC REGISTER SET SUMMARY

| | | |
|---|---|---|
| RBR | Receive Buffer Register | Read Only |
| THR | Transmit Holding Register | Write Only |
| IER | Interrupt Enable Register | Read Write |
| LCR | Line Control Register | Read Write |
| MCR | Modem Control Register | Read Write |
| MSR | Modem Status Register | Read Write |
| DLL | Divisor Latch (LS) | Read Write |
| DLM | Divisor Latch (MS) | Read Write |

RECEIVE BUFFER REGISTER

| | |
|---|---|
| RBR | Receive Buffer Register. To address, set DLAB=0 (See Line Control Register, Bit 15). [Read Only] |

APPENDIX - SIGNALS

TRANSMIT HOLDING REGISTER

| | | |
|---|---|---|
| THR | Transmit Holding Register. To address, set DLAB=0 (See Line Control Register, Bit 15). [Write Only] | |

INTERRUPT ENABLE REGISTER

| | | |
|---|---|---|
| STAT_E | Status line Interrupt Enable. Enable for delta DSR, rising edge RI, and delta DCD. Set high to enable. To address, set DLAB=0 (See Line Control Register, Bit 15) [Read/Write] | |

LINE CONTROL REGISTER

| | | |
|---|---|---|
| DLAB | Divisor Latch Access Bit | [Read/Write] |
| SET_BRK | Set Break. | [Read/Write] |
| SK_PAR | Stick Parity | [Read/Write] |
| EVN_PAR | Even Parity Select. | [Read/Write] |
| PAR_E | Parity Enable. | [Read/Write] |
| NUM_SB | Number of Stop Bits. | [Read/Write) |
| WD_L_S1 | Word Length Select Bit 1. 10=7bits. 11=8bits. | [Read/Write] |
| WD_L_S0 | Word Length Select Bit O. 00=5 bits. 01=6 bits. | [Read/Write] |

MODEM CONTROL REGISTER

| | | |
|---|---|---|
| LOOP | SCC Loop test mode. | [Read/Write] |
| OUT2_CNL | SLEEPA Output Control Register. Inversely controls the out2_ output line. When set high, the out2_ pin is driven low. When reset low, the out2_ pin is driven high. | [Read/Write] |
| OUT1_CNL | RESETA Output Control Register. Inversely controls the out1_ output line. When set high, the out1_ pin is driven low. When reset low, the out1_ pin is driven high. | [Read/Write] |
| DTR_CNT | DTR Output Control Register. Inversely controls the dtr_ output line. When set high, the dtr_ pin is driven low. When reset, it is high. | [Read/Write] |

MODEM STATUS REGISTER

| | | |
|---|---|---|
| DCD | Complement of dcd_ input pin. | [Read Only] |
| RI | Complement of ri_ input pin. | [Read Only] |
| DSR | Complement of dsr_ input pin. | [Read Only] |
| DCD_TRNS | DCD Transition. Set high on transitions of the dcd_ input line from high to low and from low to high. Reset when read. | [Read Only] |
| RI_TRNS | RI Transition. Set high on a transition of the ri_ input line from low to high. Reset when read. | [Read Only] |
| DSR_TRNS | DSR Transition. Set high on a transition of the dsr_ input line from high to low and from low to high. Reset when read. | [Read Only] |

DIVISOR LATCH (LSB)

| | | |
|---|---|---|
| DLL | Divisor Latch LSB. To address, set DLAB = 1 (See Line Control Register, Bit 7). | [Read/Write] |

DIVISOR LATCH (MSB)

| | | |
|---|---|---|
| DLM | Divisor Latch MSB. To address, set DLAB = 1 (See Line Control Register, Bit 7). | [Read/Write] |

What is claimed is:

1. A serial communications circuit coupled to a data processing system and a serial port comprising:

a) a first serial receiver and transmitter coupled to the serial port for receiving and transmitting serial data;

b) a transmit buffer coupled to the first serial receiver and transmitter for temporarily storing transmit data from the data processing system, and for providing said transmit data to the first serial receiver and transmitter;

c) a receive buffer coupled to the first serial receiver and transmitter for temporarily storing received data from the serial port and for providing said data to the data processing system;

d) a transmit register associated with the transmit buffer for storing a first pre-determined value, said first pre-determined value indicating the maximum capacity of the transmit buffer;

e) a receive register associated with the receive buffer for storing a second pre-determined value, said second pre-determined value indicating the maximum capacity of the receive buffer;

f) a transmit counter for maintaining a transmit buffer count, said transmit buffer count indicating the current amount of data in the transmit buffer;

g) a receive counter for maintaining a receive buffer count, said receive buffer count indicating a current amount of data in the receive buffer; and h) a data flow controller coupled to the first serial receiver and transmitter, the transmit buffer, the receive buffer, the transmit register, the receive register, the transmit counter, and the receive counter for allowing data to flow into the transmit and receive buffers when the transmit buffer count is less than the first pre-determined value and the receive buffer count is less than the second pre-determined value, and when the transmit buffer count and the receive buffer count exceeds or is equal to the first pre-determined value and the second pre-determined value, respectively, for stopping data flow into the transmit and receive buffers and for transferring the transmit data and receive data to the serial port and the data processing system, respectively;

wherein the data controller interrupts the data processing system based on the transmit buffer count and the receive buffer count; and wherein the transmit register and the receive register are programmable by the data processing system such that the data processing system may control the frequency at which the data processing system is interrupted by the data controller by changing the first and second pre-determined values so that the interrupt frequency is based upon a current data transfer rate between the data processing system and the serial port and a current loading of the data processing system.

2. The serial communications circuit, as claimed in claim 1, wherein said first serial receiver/transmitter further comprises an infra red receiver/transmitter for receiving an infra red signal and converting it into a signal which may be processed by said first serial receiver/transmitter and for receiving a signal from said first serial receiver/transmitter and converting it into a signal which may be transmitted as a beam of infra red energy.

3. The serial communications circuit, as claimed in claim 2 wherein said infra red signal comprises a digital data signal which has been frequency modulated.

4. The serial communications circuit, as claimed in claim 3, further comprising a frequency modulation mechanism coupled between the transmitter portion of said infra red receiver/transmitter and said first serial receiver/transmitter for converting a digital signal into a frequency modulated signal before modulation by said infra red transmitter.

5. The serial communications circuit, as claimed in claim 4, wherein said frequency modulation mechanism modulates said digital signal in accordance with a recognized industry standard.

6. The serial communications circuit, as claimed in claim 2, wherein said infra red signal comprises a digital data signal which has been pulse modulated.

7. The serial communications circuit, as claimed in claim 6, further comprising a pulse stretching mechanism coupled between the receiver portion of said infra red receiver/transmitter and said first serial receiver/transmitter for converting said pulse modulated signal into a digital signal.

8. The serial communications circuit, as claimed in claim 6, further comprising a pulse encoder mechanism coupled between the transmitter portion of said infra red receiver/transmitter and said first serial receiver/transmitter for converting a digital signal into a pulse modulated signal before modulation by said infra red transmitter.

9. The serial communications circuit, as claimed in claim 1, wherein said data processing system includes a data bus which complies with the specifications of IEEE Standard 1496-1993.

10. The serial communications circuit, as claimed in claim 1, further including a second serial receiver/transmitter for receiving and transmitting serial data external of said communications circuit through a second serial port.

11. The serial communications circuit, as claimed in claim 1, wherein said data flow controller further allows data to be entered into said transmit buffer or removed from said transmit buffer after a first predetermined period of time has elapsed, regardless of whether said transmit buffer has been filled to a predefined percentage of its maximum capacity.

* * * * *